US009448998B1

(12) United States Patent
Bluhm

(10) Patent No.: US 9,448,998 B1
(45) Date of Patent: *Sep. 20, 2016

(54) SYSTEMS AND METHODS FOR MONITORING MULTIPLE HETEROGENEOUS SOFTWARE APPLICATIONS

(75) Inventor: Emory W. Bluhm, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/556,678

(22) Filed: Jul. 24, 2012

Related U.S. Application Data

(60) Continuation of application No. 12/238,550, filed on Sep. 26, 2008, now Pat. No. 8,229,884, which is a division of application No. 12/132,746, filed on Jun. 4, 2008.

(51) Int. Cl.
*G06F 17/30* (2006.01)
*G06F 11/32* (2006.01)
*H04L 12/26* (2006.01)

(52) U.S. Cl.
CPC ............ *G06F 17/30* (2013.01); *G06F 11/324* (2013.01); *H04L 12/2602* (2013.01); *G06F 2201/865* (2013.01)

(58) Field of Classification Search
CPC ........... G06F 2201/865; G06F 11/327; G06F 11/328; G06F 11/324; G06F 2201/86; G06F 11/3055; G06F 2201/875; G06F 11/3086; G06F 11/3058; G06F 11/3428; G06F 9/45512; H04L 12/2602

USPC ......................................... 717/115
See application file for complete search history.

(56) References Cited

U.S. PATENT DOCUMENTS

| 6,754,664 | B1 | 6/2004 | Bush |
| 7,171,628 | B1 * | 1/2007 | Perttunen ...................... 715/853 |
| 7,451,005 | B2 * | 11/2008 | Hoffberg et al. ............... 700/83 |
| 7,526,685 | B2 * | 4/2009 | Noy et al. ...................... 714/47.2 |
| 7,557,702 | B2 * | 7/2009 | Eryurek et al. ............... 340/511 |

(Continued)

OTHER PUBLICATIONS

Krishnamurthy, Bharat, et al. "Data Tagging Architecture for System Monitoring in Dynamic Environments", IBM Research Report, RI 07008, Nov. 5, 2007. IBM Research Division—Almaden-Austin-Beijing-Delhi-Haifa-T.J. Watson—Tokyo-Surich. pp. 1-18.

*Primary Examiner* — Leslie Wong
(74) *Attorney, Agent, or Firm* — Baker & Hostetler LLP

(57) ABSTRACT

A system monitors each of multiple applications. For each application, a corresponding monitoring script sets forth procedures for monitoring the application. A script execution engine executes each script, and each executed script retrieves indicia to be monitored from the corresponding application. For each retrieved indicia, the script generates a corresponding record in a generic format employed across all applications, which includes a date and time the indicia was retrieved, a name of the application from which the indicia was retrieved, a name of the indicia, and a value for the retrieved indicia. A monitoring database stores the records generated by each script in the generic format. A generic monitoring console retrieves various records in the generic format from the monitoring database for various ones of the multiple applications and displays monitoring information for various ones of the multiple applications as generated from the various records.

20 Claims, 6 Drawing Sheets

(56) References Cited

U.S. PATENT DOCUMENTS

| | | |
|---|---|---|
| 7,568,019 B1* | 7/2009 | Bhargava et al. ............ 709/223 |
| 7,644,138 B2* | 1/2010 | Sun ............................... 709/219 |
| 7,734,775 B2* | 6/2010 | Barnett et al. ................ 709/224 |
| 8,229,884 B1* | 7/2012 | Bluhm .......................... 707/608 |
| 2002/0091753 A1 | 7/2002 | Reddy et al. |
| 2002/0178077 A1* | 11/2002 | Katz et al. ..................... 705/26 |
| 2003/0009484 A1* | 1/2003 | Hamanaka et al. .......... 707/200 |
| 2003/0036886 A1* | 2/2003 | Stone ............................ 702/188 |
| 2004/0267897 A1 | 12/2004 | Hill et al. |
| 2005/0091647 A1 | 4/2005 | McCollum et al. |
| 2006/0136545 A1* | 6/2006 | Reistad et al. ................ 709/200 |
| 2006/0248118 A1* | 11/2006 | Curtis et al. ................ 707/104.1 |
| 2007/0136814 A1* | 6/2007 | Lee et al. ......................... 726/25 |
| 2007/0240118 A1 | 10/2007 | Keren |
| 2010/0076642 A1* | 3/2010 | Hoffberg et al. ............... 701/29 |

* cited by examiner

DATABASE 22

| DATE | TIME | AP | HOST | SEV | SEVERITY MSG | TEST | INST | STATUS NUM | STATUS TEXT |
|---|---|---|---|---|---|---|---|---|---|
| 2007/10/30 | 06:57:40 | EML | PRODBAT1W | 3 | | MSR Work Portal | ALL_OTHER_MESSAGES | 2184 | |
| 2007/10/30 | 06:57:40 | EML | PRODBAT1W | 5 | | LhUnderwriting | ALL_OTHER_MESSAGES | 0 | |
| 2007/10/30 | 06:57:40 | EML | PRODBAT1W | 1 | Message count > 12000 | EML | Total Records Fetched | 12042 | |
| 2007/10/29 | 00:01:26 | DIRECT_BANKING | prodbankint1a | 5 | 124 Successful Transaction(s) | LIVE_MONEY | BUIB_SOFT_POST | 124 | Successful |
| 2007/10/29 | 00:01:26 | DIRECT_BANKING | prodbankint2a | 5 | 38 Successful Transaction(s) | LIVE_MONEY | BUIB_SOFT_POST | 38 | Successful |
| 2007/10/29 | 00:01:26 | DIRECT_BANKING | prodbankint3a | 5 | 96 Successful Transaction(s) | LIVE_MONEY | BUIB_SOFT_POST | 96 | Successful |
| 2007/10/29 | 00:01:26 | DIRECT_BANKING | prodbankint4a | 5 | 34 Successful Transaction(s) | LIVE_MONEY | BUIB_SOFT_POST | 34 | Successful |

SYSTEMS AND METHODS FOR MONITORING MULTIPLE HETEROGENEOUS SOFTWARE APPLICATIONS

CROSS-REFERENCE TO RELATED APPLICATION(S)

The present application is a continuation application of Ser. No. 12/238,550, filed Sep. 26, 2008, now U.S. Pat. No. 8,229,884, which is a divisional patent application of U.S. patent application Ser. No. 12/132,746 filed Jun. 4, 2008, the entirety of which is hereby incorporated by reference herein. Further, this application is related by subject matter to that disclosed in the following commonly assigned application, the entirety of which is hereby incorporated by reference herein: U.S. patent application Ser. No. 12/238,568, filed Sep. 26, 2008.

FIELD

The present disclosure is directed to systems and methods that allow monitoring of multiple heterogeneous software applications. More particularly, the present disclosure is directed to such systems and methods that define for any particular application the features thereof to be monitored, and that present the monitored features in a common interface.

BACKGROUND

In any organization it may be the case that there are multiple disparate software applications being operated by or on behalf of the organization. For example, in an insurance organization there may be software applications to effectuate issuance of insurance policies, servicing of insurance claims, determinations of insurance risks, and the like. Additionally, there may be software applications for operating a network information site on behalf of the insurance organization, for maintaining human resources information, for tracking customers, for operating telephones and other communications systems, for automating building operations, for tracking finances, for managing investments, for managing legal interests, and the like.

As may be appreciated, each of the disparate applications should be monitored by the organization to ensure that the application is running correctly and efficiently, among other things. Typically, although by no means exclusively, an application may be monitored in terms of availability, performance, and capacity. Of particular interest is availability, which is to say that the application is running and able to perform the intended function thereof. As known, such availability is defined according to a present state of the application, and accordingly such availability should be monitored on a real-time or near-real-time basis. Availability of an application is usually determined based on monitoring various ones of the components of the application. For example, an application may contain a number of incoming and outgoing queues, a number of registers, a number of processes, a number of data stores, a number of memory spaces, etc., and such queues, registers, processes, data stores, memory spaces, etc., may each be monitored.

Notably, the aforementioned disparate software applications may be characterized as being heterogeneous in that such applications vary widely in terms of their functionality and their operational requirements, among other things. Nevertheless, all of such applications of the organization are likely expected to be monitored on behalf of the organization by a single software operations group or the like. However, such monitoring is made more difficult due to the heterogeneous nature of the applications. That is, each software application likely has a monitoring function or 'console' to monitor such application, and all of the monitoring consoles are closely tied to their respective applications. As a result, each monitoring console operates separately from other monitoring consoles and data from all of the monitoring consoles cannot easily be aggregated so as to be viewable by way of a single monitoring console.

Accordingly, a need exists for a system and method for monitoring multiple heterogeneous software applications by gathering monitoring data from each application in a homogenous form so that the gathered data can be presented in a single coherent form. More particularly, a need exists for such a system and method whereby each heterogeneous software application as developed or acquired can be monitored with relative ease.

SUMMARY

The aforementioned needs are satisfied at least in part by a system and method for monitoring each of multiple applications. In the system, for each of the multiple applications, a corresponding monitoring script is provided and sets forth procedures for monitoring the application. A script execution engine executes each monitoring script, and each monitoring script as executed by the script execution engine retrieves a plurality of indicia to be monitored from the corresponding application. For each retrieved indicia, the script generates a corresponding record setting forth the retrieved indicia, where each record is generated according to a generic format employed across all of the multiple applications.

The generic format employed across all of the multiple applications includes a date and time the indicia was retrieved, a name of the application from which the indicia was retrieved, a name of the indicia, and a value for the retrieved indicia. A monitoring database stores the records generated by each script in the generic format. A generic monitoring console retrieves various records in the generic format from the monitoring database for various ones of the multiple applications and displays monitoring information for various ones of the multiple applications as generated from the various records.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings:

FIG. 3 is a chart showing generated records as stored in the monitoring database of the framework of FIG. 2 in accordance with various embodiments of the present innovation;

DETAILED DESCRIPTION

Example Computing Environment

Figure 1:
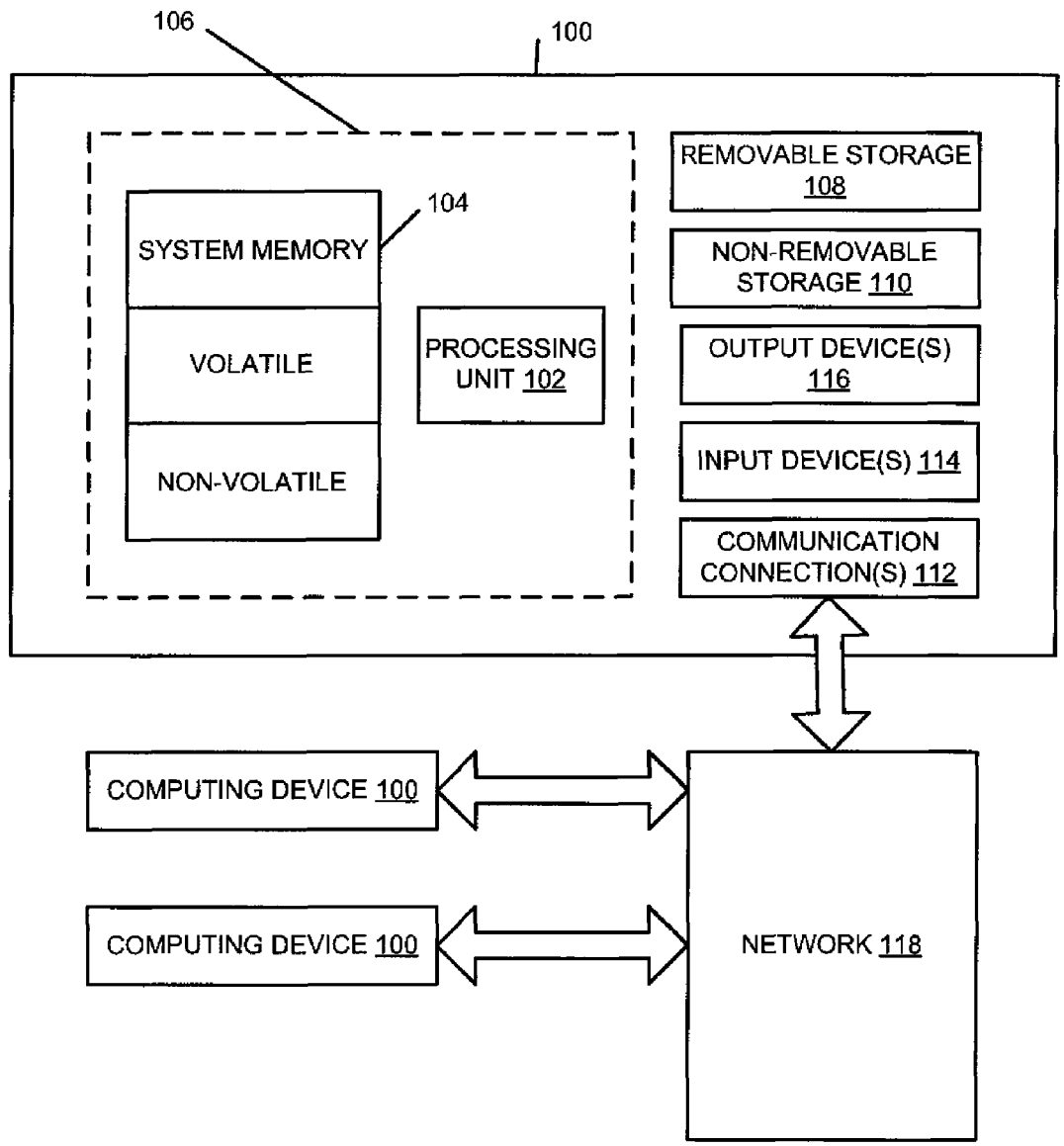
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Monitoring Multiple Heterogeneous Software Applications

Figure 2:
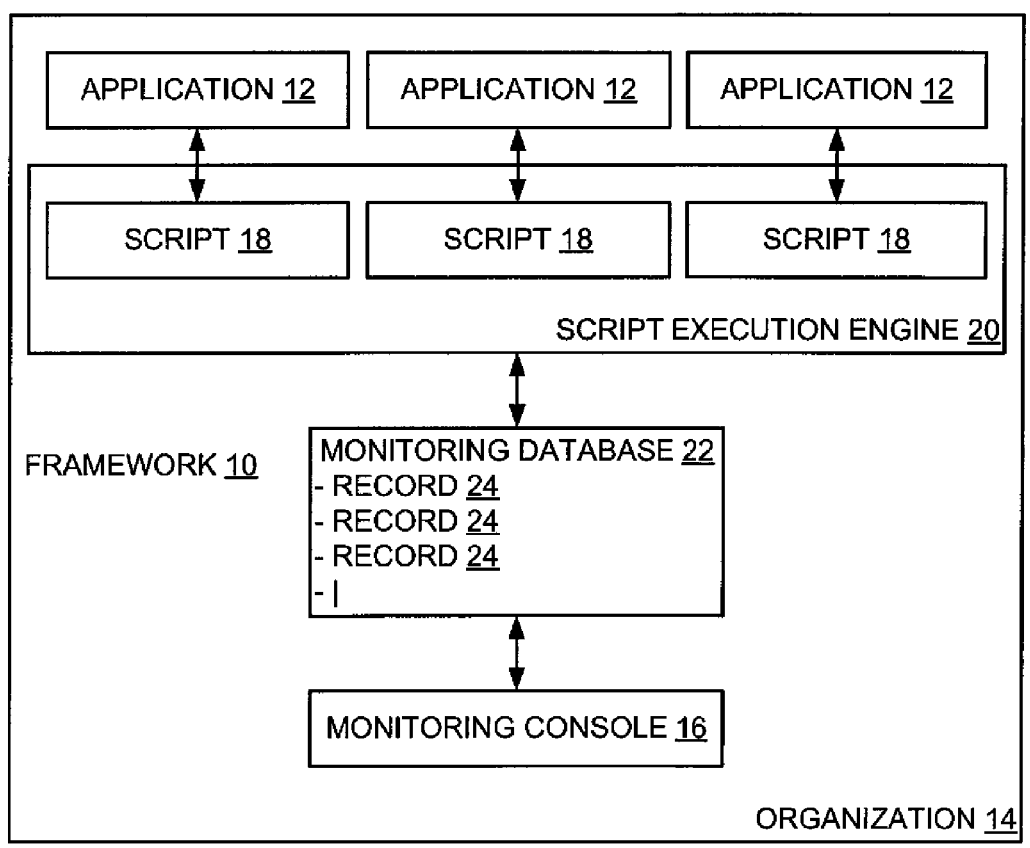
FIG. 2 is a block diagram of a system or framework for monitoring multiple disparate applications at a generic console in accordance with various embodiments of the present innovation.

In various embodiments of the present innovation, and turning now to FIG. 2, an application monitoring framework 10 is provided to monitor multiple disparate applications 12 within an organization 14 or the like by way of a single generic monitoring console 16, although multiple consoles 16 may also be employed. With such a framework 10, the status of application components is available at least in near-real-time without the need to individually access the production environment or the need to be a subject matter expert in each application 12. With such a generic monitoring console 16 for all of the applications 12, a consolidated availability command center may be employed for all of the application 12, notification of health issues regarding applications 12 before such issues escalate, reduced service interruptions, and accelerated returns to service when an issue is found with respect to an application 12.

The framework 10 may be considered primarily in terms of each application 12, a monitoring script 18 for monitoring aspects of the application 12, a script execution engine 20 for executing each monitoring script 18, a monitoring database 22 for storing data generated by each monitoring script 18, and the aforementioned generic monitoring console 16 for organizing and aggregating data in the monitoring database 22 and displaying same to a monitoring agent or the like.

The Application 12

In various embodiments of the present innovation, the framework 10 enables monitoring of any disparate application 12/system/etc. (hereinafter, 'application 12') regardless of platform. This includes both internally developed applications 12, procured applications 12, externally provided applications 12, etc. Accordingly, the application 12 may be most any software application 12 without departing from the spirit and scope of the present innovation.

Notably, each application 12 may be monitored for different application indicia, and accordingly the monitored indicia of each application 12 may be most any indicia without departing from the spirit and scope of the present innovation. Notably, such indicia may be identified based both on expectations and experience, and accordingly may include those indicia that one would expect to be monitored as well as those indicia that have been found in practice to be valuable as predictive, significant, and/or the like. As used herein and as should be understood, an indicia that may be monitored with regard to an application 12 is generally any value that may be obtained in connection with the application 12, where the value has some probative use regarding how the application is operating. Key questions that should be considered when identifying indicia of an application 12 to be monitored include those indicia that are typically examined first when the application 12 is not functioning properly, those indicia that are retrieved after the application 12 has failed, those indicia that represent the possibility of the application 12 failing, those indicia that represent that the application 12 is experiencing difficulty, and the like.

One type of candidate for monitoring in an application 12 is the error logs generated by or on behalf of the application 12, as should be appreciated. Significantly, if each error log is stored in a relational repository or other data structure that can be queried, such log can provide a wealth of information relative to a current state of the application 12. In a similar manner, another type of candidate for monitoring in an application 12 is the transaction logs generated by or on behalf of the application 12. Likewise, when each transaction log is stored in a relational repository or other data structure that can be queried, statistics such as volume and response time among others may be generated therefrom. As should be appreciated, the presentation of such statistics in aggregate form provides great insight into the efficiency and utilization of the application 12.

Indicia of an application 12 that should be monitored may include metrics regarding the application 12 itself, but metrics regarding processes and structures relating to the application 12 can be more valuable. Examples of such metrics regarding a process include whether the process is running, processor utilization by the process, memory utilization by the process, handle and thread counts for the process, and the like. Additionally, a database of the application 12 may be monitored for indicia such as how many users are using the application 12, how many items are in various application workflow queues, the state of key operating parameters, transaction volume, transaction response time, and the like. Also, a file system of the application 12 may be monitored for indicia such as the last modified time stamp of a key file or files, how many files are in a particular directory, whether a share is available, the file size of a particular file or directory, and the like.

Other indicia of an application 12 that can be monitored include connectivity of devices and databases of the application 12, among other things. Also, available utilities from the application 12 and/or an operating system upon which the application 12 is executing can be used to gather data indicative of the application 12 and the health thereof. In a similar manner, XML (extensible markup language) servlets may be executed to produce XML results which are then consumed, analyzed and recorded.

The Monitoring Script 18

The monitoring script 18 for each application 12 should be developed in conjunction with the application 12 and by those individuals familiar with the indicia of the application 12 that especially should be monitored. Thus, the monitoring script 18 likely is the responsibility of those individuals that develop and maintain the application 12, and not those individuals that maintain and monitor the monitoring console 16, the script execution engine 20, and the database 22, which collectively may be characterized as monitoring operations.

For purposes of modularity and ease of maintenance and revision, the monitoring script 18 should not be built into the corresponding application 12, although the application 12 if being built by the individuals that are developing the monitoring script 18 should be designed, developed and/or implemented to facilitate application monitoring. Thus, the application 12 is not expected to supply metrics directly but may log errors and transactions in a way that will facilitate scripted mining for monitoring indicia, among other things.

Note that monitoring of an application 12 as performed based on a corresponding monitoring script 18 should be mindful of the balance between the criticality of the application 12 being monitored and the amount of monitoring data collected and stored based on the monitoring script 18. That is to say, a critical application 12 should not be materially slowed by the monitoring thereof, and a non-critical application 12 should not be excessively monitored, among other things.

As should be appreciated, the monitoring script 18 is the central gatherer of health indicators for the application 12. Such monitoring script 18 may take any appropriate form and may be written in any appropriate language without departing from the spirit and scope of the present innovation. For example, and with regard to the latter, the monitoring script 18 may be developed in an appropriate scripting language, such as for example the PERL or Java Script language. Notably, a monitoring script 18 once written may contain a considerable amount of utility functions that are generally common among scripts 18 and thus available for re-use in new scripts 18. Thus, a new script 18 for a new application 12 may be based on an old script 18 for an old application 12, with appropriate modifications that would focus on application-specific health indicator requirements.

Typically, a script 18 is written for an application 12 upon gathering the aforementioned indicia to be monitored, and then grouping related ones of such indicia into one or more 'tests'. Each test is then written into the script 18 such that a particular test gathers certain indicia and analyzes same against thresholds or set severity levels (hereinafter, 'thresholds'). Presumably, scripts 18 written across multiple applications 12 all employ the same severity level scale as a common scale, and the relative severity at each level in the scale is presumably roughly equal across the scripts 18 for the applications 12. Accordingly, and for example, a severity level of 2 in one application 12 should be given roughly the same attention as a severity level of 2 in any other application 12.

Notably, if a particular indicia passes a corresponding threshold, the script 18 as written may include an action to be taken, such as for example paging an individual and/or showing an alert on the monitoring console 16. Additionally, the action to be taken may be a prescriptive action that corrects or at least subdues the cause of the indicia passing the threshold. Writing such a script 18 in such a manner should be apparent based on the present disclosure and therefore need not be set forth herein in any detail other than that which is provided.

The script 18 as written gathers the indicia to be monitored from appropriate components of the application 12. Such appropriate components may include but are not limited to a database of the application 12, an operating system upon which the application 12 is executing, a file system of the application 12 or the operating system, a command line utility of the application 12 or the operating system or the file system, a register, a memory, and the like. Additionally, the script 18 as written upon gathering a particular indicia formats same as may appropriate into an individual record 24 of information that is generic across applications 12 and that is recognizable by the monitoring console 16. Such record 24 may take any appropriate form without departing from the spirit and scope of the present innovation.

For example, in various embodiments of the present innovation, each record 24 as produced by any monitoring script 18 includes a standard set of 10 fields of information: Date, Time, Application Name, Host Name, Test Name, Instance Name, Numeric Status Value, Text Status Value, Severity Indicator, and Severity Message. Each field is explained in more detail as follows:

The "Date" and "Time" respectively set forth the date and time the indicia corresponding to the record 24 was collected. Such date and time may take any appropriate form as long as the form is consistent across all records 24 from all monitoring scripts 18. Thus, the date and time may be local or may be based on Coordinated Universal Time, among other things.

The "Application Name" is the name of the application 12 from which the indicia corresponding to the record 24 was collected, and should be utilized for all records 24 provided by any particular monitoring script 18, or replicated copies of the monitoring script 18 utilized on multiple devices. If the monitoring script 18 is being used to collect data for a family of multiple different systems or applications 12, the "Application Name" will represent the family.

The "Host Name" is the name of a host upon which the application 12 is executing and from which the indicia corresponding to the record 24 that was collected, which may be a server or the like. As may be appreciated, an application 12 may be running on multiple hosts or multiple applications 12 may be executing on a single host. As may also be appreciated, identifying the host may be useful in identifying issues that relate to a particular host, and assists an operator or the like at the monitoring console 16 in identifying a particular host on which the application 12 may not be functioning properly, among other things.

The "Test Name" is the name of the test in the script 18 that resulted in the indicia corresponding to the record 24 that was collected. Notably, a particular test may be run against multiple instances of an object, such as for example multiple queues of an application 12, multiple registers, and the like. Accordingly, "Instance Name" identifies the particular instance of the object from which the indicia corresponding to the record 24 was collected. For example, a test that is run against all outgoing queues of an application 12 may result in a record 24 for each instance, where the record 24 would identify each instance accordingly (instance 1, instance 2, etc.). As may be appreciated, identifying each instance is useful when identifying issues that relate to a particular instance, and assists an operator or the like at the monitoring console 16 in identifying a particular instance that may not be functioning properly, among other things.

The "Numeric Status Value" if included in a record 24 is a numeric value representative of the indicia corresponding to the record 24 that was collected, and may be any appropriate value based on such indicia. For example, if a particular test collects the number of items in a queue, the Numeric Status Value may be such number of items. In a similar manner, the "Text Status Value" if included in a record 24 is a textual representation of the indicia corresponding to the record 24 that was collected, and may be any appropriate text based on such indicia. For example, if a particular test determines that the number of items processed per hour is less than 500, the Text Status Value may so state. Alternately, the Text Status Value may provide additional information relevant to the Numeric Status Value.

The "Severity Indicator" is a value assigned to the indicia corresponding to the record 24 that was collected and represents whether the indicia exceeds a corresponding threshold, and if so to what degree. For example, the severity may be set to "5" unless the script 18 has analyzed the indicia collected and identified that the threshold has been surpassed. If so, a severity of 4 may represent a minimal or informational severity, 3 a warning, 2 a critical warning, and 1 a fatal warning. In such an arrangement, a severity of less than 5 may be accompanied by a message in the "Severity Message" field of the record 24. As may be appreciated, such severity message instructs the aforementioned operator at the monitoring console 16 regarding how to react.

In various embodiments of the present innovation, and as was alluded to above, a monitoring script 18 upon executing and determining that an indicia has a corresponding severity indicator requiring attention can issue an alert to obtain such attention. For example, the script 18 upon so determining can issue a pager alert to an on-call operator, and/or may issue one or more electronic messages to such on-call operator and/or other relevant personnel. Additionally or in the alternative, the script 18 upon so determining may take a prescriptive action such as for example resetting the application 12, shutting down the application 12, executing a prescriptive function, and the like.

The Script Execution Engine 20

The script execution engine 20 executes each script 18 for each application 12 in the organization 14. Such script execution engine 20 may be most any appropriate engine without departing from the spirit and scope of the present innovation. For example, the engine 20 may utilize the PATROL system or IBM Tivoli Monitoring functionality to schedule recurring execution.

Each test as set forth in each monitoring script 18 may include information regarding when and how often the test is to be performed by the script execution engine 20. For example, the test may be performed every minute, every five minutes, every hour, or the like. Additionally, the test may be performed conditionally, such as only in the event another test results in a particular indicia with a particular severity level. Alternately, the script execution engine 20 may determine when and how often each test in each script 18 is performed.

The Monitoring Database 22

As may be appreciated and as seen in FIG. 2, each record 24 as produced by any monitoring script 18 with the standard set of fields is inserted into the monitoring database 22. Such inserting is known or should be apparent and therefore need not be set forth herein in any detail other than that which is provided. As may be seen in FIG. 2, the monitoring console 16 only presents that which is retrieved from the monitoring database 22.

Such monitoring database 22 may be most any appropriate database without departing from the spirit and scope of the present innovation. For example, the monitoring database 22 may be a table database or a relational database. If a table database in particular, such database 22 may include one table with all records 24 from all applications 12, or multiple tables with records 24 divided therebetween in some orderly fashion. Such database 22 is known or should be apparent and therefore need not be set forth herein in any detail other than that which is provided. An example of records 24 in a table database format is shown in FIG. 3.

The monitoring database 22 should have sufficient capabilities to receive records 24 as supplied by the script execution engine 20. For example, the monitoring database 22 should be able to receive at least one record 24 per second on average if not more. Also, the monitoring database 22 should have sufficient capacity to store an amount of records 24 from tests for at least a set period of time. For example, the monitoring database 22 should be capable of holding records 24 representing the past week or month. Note here that the database 22 may either purge older records 24 or may move such older records 24 to archival storage.

The Monitoring Console 16

The Monitoring Console 16 retrieves various of the records 24 from the monitoring database 22 and employs same to display various relevant information to an operator at the console 16. As may be appreciated, the monitoring console 16 may be most any monitoring console without departing from the spirit and scope of the present innovation. For example, the monitoring console 16 may be the IBM Tivoli Monitoring (ITM) dashboard, which is essentially the Tivoli Enterprise Portal Server (TEPS) product from the ITM family of products as developed and/or marketed by IBM Corporation of Armonk, N.Y.

Such monitoring console 16 may therefore include a navigator, which is a hierarchical view showing multiple hierarchical levels of application health, with a consolidation of unhealthy alarms at the top, followed by details for each application 12 or system, and where applicable each application 12 or system has a resources level detailing the health of the dependent devices. As may be appreciated, opening a level in the navigator reveals the next level in that branch. Opening the application 12 or system level reveals the names for specialized detail views associated with that application 12 or system. Such detailed views are predefined, and are based on corresponding current records 24 as retrieved from the monitoring database 22 by corresponding predefined queries.

As may be understood, each detailed view may include one or more items such as charts, tables, meters, and the like. As may be appreciated, each item may be constructed based on one or more relevant records 24 from the monitoring database 22. For example, a meter in a detailed view for an application 12 may show a current rate from a corresponding current record 24 in the monitoring database 22, where the record 24 sets forth a rate, such as a number of items in a queue. Correspondingly, a table in a detailed view for an application 12 may show current values from corresponding current records 24 in the monitoring database 22, where the records 24 set forth appropriate values. Alternately, a table in a detailed view for an application 12 may show historical values from corresponding records 24 in the monitoring database 22, where the records 24 set forth the historical values for the past hour, past day, etc. As may be appreciated, the tables, charts, and the like from the detailed views are intended to provide meaningful information from the data being collected by the monitoring scripts 18 from the applications 12. Presumably, the detailed views lead to an understanding of what may be causing a particular problem, and can be refined as may be appropriate to focus on important details.

In the monitoring console 16, each device being monitored may have a corresponding agent that queries the monitoring database 22 for relevant records 24 therein. The agent may cache a number of current records 24 that are then employed to populate various ones of the detailed views as may be appropriate. The agent may also aggregate data from the records 24 as may be appropriate and/or desirable if the aggregated data is to be included in a detailed view, or the monitoring console 16 may itself perform such function. Once the agent query returns data, the detailed views can be created to display the returned data.

For each application 12 or system, the monitoring console 16 may include a real-time query relating to a current status of the application 12, and also a recent history query relating to a status of the application 12 over a recent period of time such as for example an hour or a day. For the top level of the navigator, which shows the consolidation of unhealthy alarms, the monitoring console 16 may query the database 22 for all current records 24 (i.e., those in the past few minutes or so) having a heightened severity code (i.e., of 1, 2 or 3).

Adding an Application 12 or System to the Framework 10

Figure 4:
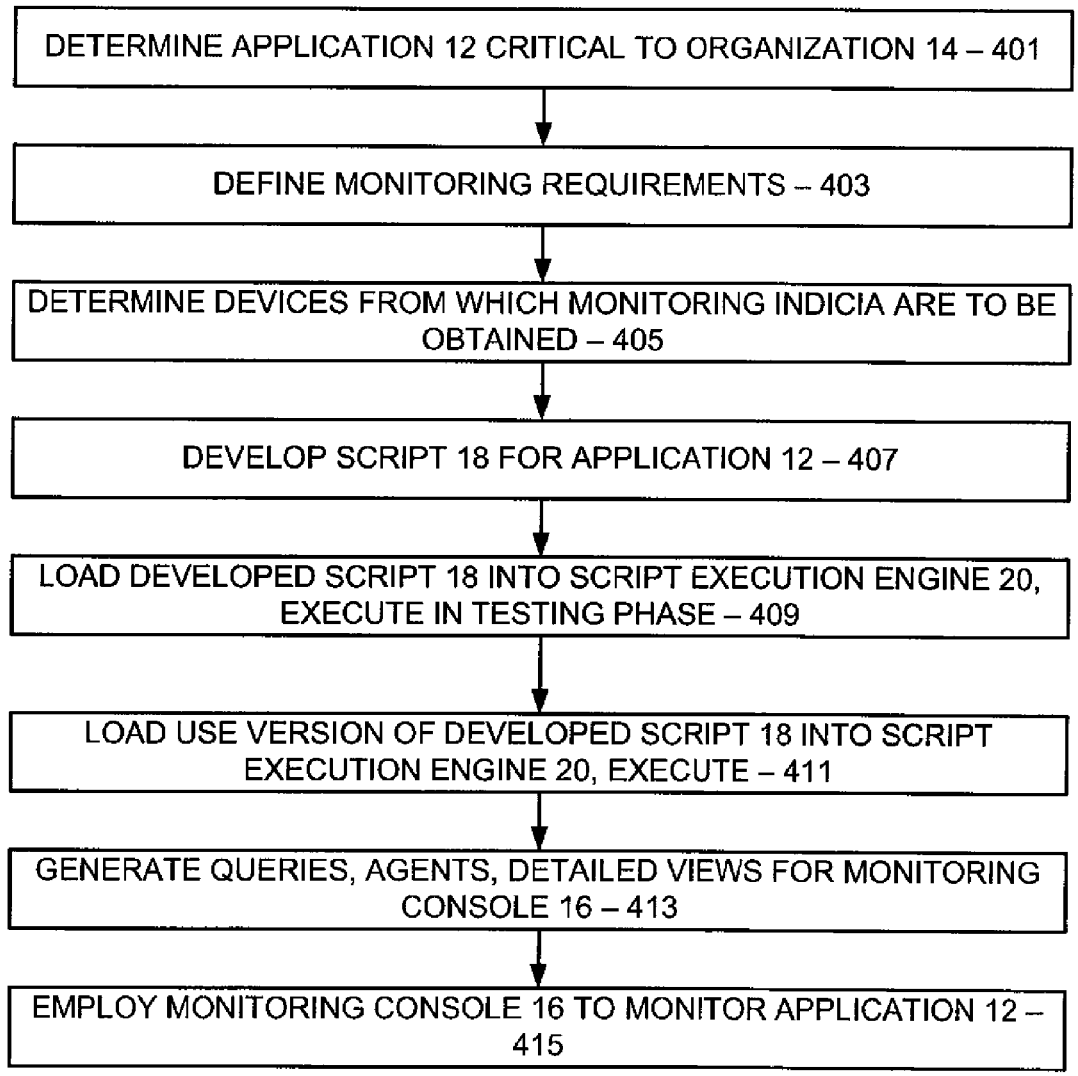
FIG. 4 is a flow diagram showing actions performed in the course of adding an application to the framework of FIG. 2 in accordance with various embodiments of the present innovation.

Turning now to FIG. 4, following are steps that should be implemented when considering whether to add an application 12 to the framework 10. Preliminarily, a determination should be made of whether the application 12 under consideration is critical to the organization 14 (401). Such criticality is usually established based on what would happen if the application 12 were to be shut down on an involuntary basis, although such criticality may also be established based on any other rationale. Once it is decided that the application 12 is indeed critical and should be added to the framework 10, the next step is to define the monitoring requirements (403) and then determine the appropriate devices from which monitoring indicia is to be obtained (405). Based thereon, a script 18 may be developed for the application 12, either as an entirely new script 18 or more likely based on modifications to a copy of an existing script 18 (407).

The developed script 18 for the application 12 is then loaded into the script execution engine 20 for execution thereby in a testing phase in which records 24 are generated by the script 18 and stored in the monitoring database 22, but the records 24 are not specifically retrieved by the monitoring console 16 (409). Presumably, any issues that arise in connection with the script 18 during the testing phase are addressed, and a use version is arrived at. Thereafter, the use version of the developed script 18 for the application 12 as loaded into the script execution engine 20 for execution thereby is in fact executed to generate records 24 that are stored in the monitoring database 22 and retrievable by the monitoring console 16 (411). Appropriate queries for such retrievable records 24 are then generated for the monitoring console 16, as are agents, detailed views, and the like (413), and the monitoring console 16 is then employed to monitor the application 12 (415).

Operation of Framework 10

Figure 5:
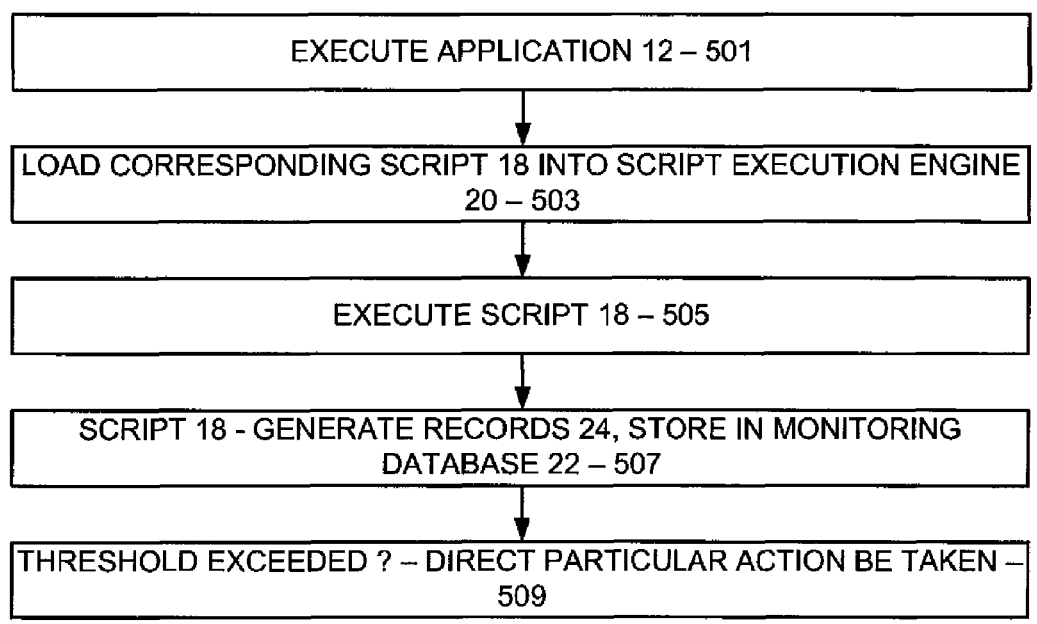
FIG. 5 is a flow diagram showing actions performed in the course of operating the framework of FIG. 2 to add records to the database of FIG. 2 in accordance with various embodiments of the present innovation.

To summarize all of the above, and turning now to FIG. 5, the monitoring framework 10 with multiple disparate/heterogeneous applications 12, each having a corresponding monitoring script 18, is operated in the following manner, generally. Preliminarily, each application 12 is executing for the organization 14 (501) and the corresponding script 18 for the application 12 is loaded into the script execution engine 20 (503). Thereafter, the script 18 is executed by the execution engine 20, either at the behest of the script 18 or the engine 20 itself (505) and the executed script 18 generates a number of records 24, each of which is stored in the monitoring database 22 (507). Significantly, each record as generated is in a format that is generic across all applications 12 and is recognizable by the monitoring console 16. Additionally, if a particular test of the script 18 shows that a threshold is exceeded the script 18 directs that a particular action be taken (509).

Figure 6:
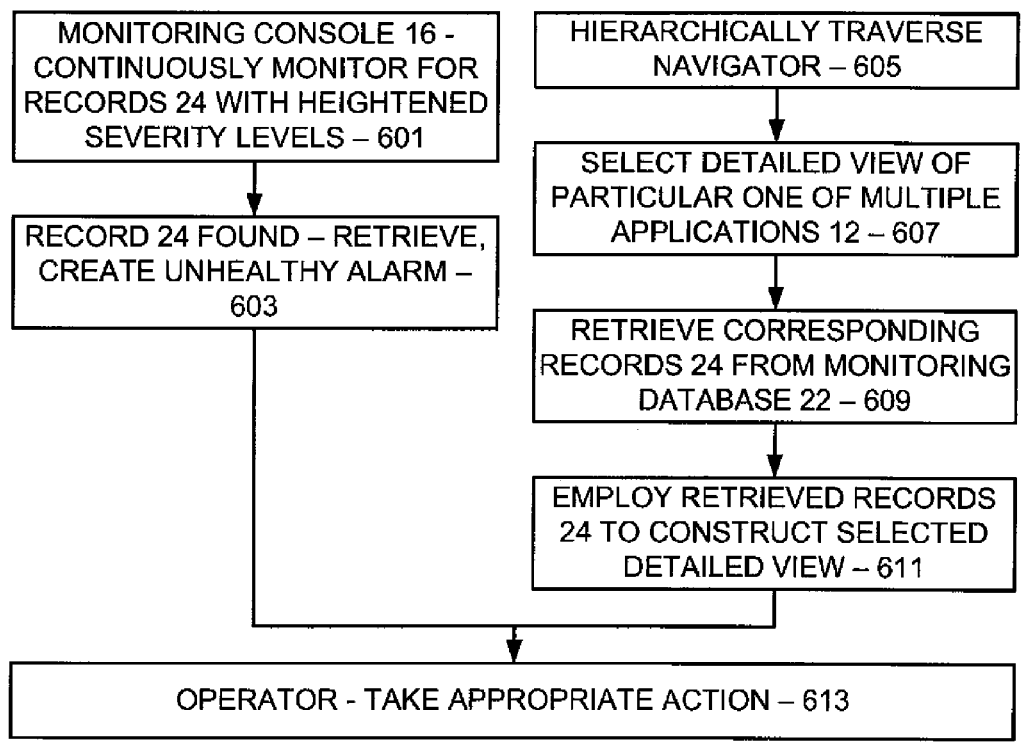
FIG. 6 is a flow diagram showing actions performed in the course of the monitoring console of FIG. 2 retrieving and employing records from the database of FIG. 2 in accordance with various embodiments of the present innovation.

With the records 24 as accumulated in the monitoring database 22, the monitoring console 16 retrieves appropriate ones of such records 24 as may be appropriate. In particular, and turning now to FIG. 6, the monitoring console 16 continuously monitors for records 24 with heightened severity levels (601) and upon finding same retrieves and employs such records 24 to create a consolidation of unhealthy alarms at a top level of the navigator thereof (603). Additionally, the monitoring console 16 allows the navigator thereof to be hierarchically traversed (605) so that a detailed view of a particular one of the multiple applications 12 may be selected (607). Upon so accessing, the monitoring console 16 employs one or more corresponding queries to retrieve corresponding records 24 from the monitoring database 22 (609), and the retrieved records 24 are then employed to construct the selected detailed view (611).

Upon reviewing the unhealthy alarms as at 603 and/or the selected detailed view as at 611, an operator or the like may then take any appropriate action (613). As one example, if the operator notices that a particular beneficial operating condition is not present with regard to an application 12, the operator may direct that the beneficial condition be implemented for the application 12.

CONCLUSION

Thus far, the various embodiments of the present innovation have been set forth primarily in terms of an organization 14 having multiple heterogeneous and/or disparate applications 12 that should be monitored as having some degree of criticality. However, and as should be appreciated, the organization 14 may instead be an individual, the number of applications 12 may be only one, the applications 12 need not necessarily be heterogeneous and/or disparate, and the relative criticality of each application 12 may be immaterial, all without departing from the spirit and scope of the present innovation. Thus, the framework 10 as set forth herein may be applicable to most any monitoring circumstances, again without departing from the spirit and scope of the present innovation.

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided that monitor multiple heterogeneous software applications 12 by gathering monitoring data from each application 12 in a homogenous form so that the gathered data can be presented by way of a generic monitoring console 16. Each heterogeneous software application 12 as developed or acquired can be monitored with relative ease by way of a monitoring script 18 customized to the application 12. The monitoring script 18 when actuated produces monitoring data in a homogenous form that may be employed by the generic monitoring console 16.

It should be appreciated that changes could be made to the embodiments described above without departing from the innovative concepts thereof. For example although an insurance company has been set forth above as an example of an organization 14 that would employ such a monitoring framework 10, any other type of organization 14 may also employ the such framework 10 without departing from the spirit and scope of the present innovation. It should be understood, therefore, that this innovation is not limited to the particular embodiments disclosed, but it is intended to cover modifications within the spirit and scope of the present innovation as defined by the appended claims.

The invention claimed is:

1. A method, comprising:
executing a first monitoring script to monitor a first application and a second monitoring script to monitor a second application sin a script execution engine, the first application and the second application run on different operating systems;
gathering a first indicia using the first monitoring script and a second indicia using the second monitoring script, the first indicia related to functioning of the first application and the second indicia related to functioning of the second application, the first indicia and the second indicia corresponding to metrics, wherein the metrics include a last modified time stamp of a file in a directory of a monitored computing device and a count of a number of files in the directory of the monitored computing device;
generating a first record based on the first indicia and a second record based on the second indicia, the first record and the second record are in a standardized format;
retrieving the first record and the second record; and
displaying a portion of one or more of the first indicia, the first record, the second indicia, and the second record.

2. The method of claim 1, further comprising:
storing the first record and the second record for the first application and the second application in a monitoring database, wherein retrieving the first record and the second record is performed via the monitoring database.

3. The method of claim 1, further comprising gathering the first indicia and the second indicia includes retrieving indicia from at least one of an error log of a corresponding application, a transaction log of the corresponding application, metrics regarding processes and structures relating to the corresponding application, a database of the corresponding application, a file system of the corresponding application, a utility of the corresponding application, an operating system upon which the corresponding application is executing, and an executed servlet of the corresponding application.

4. The method of claim 1, further comprising displaying at least a portion of one or more of the first indicia, the first record, the second indicia, and the second record is performed via a standardized monitoring console.

5. The method of claim 1, wherein the first application and the second application include disparate applications monitored for disparate indicia.

6. The method of claim 1, further comprising analyzing the first indicia and the second indicia against a standardized threshold applied to the first indicia and the second indicia.

7. The method of claim 6, further comprising determining a severity level associated with the first indicia and the second indicia.

8. The method of claim 7, further comprising applying a standardized severity level to a plurality of monitored indicia including the first indicia and the second indicia.

9. The method of claim 6, further comprising:
determining a severity level based on at least one of the first indicia or the second indicia; and
determining whether to provide an alert based on the severity level associated with the monitored indicia.

10. The method of claim 1, further comprising grouping related indicia of the first indicia or the second indicia into one or more tests, at least one of the first record and the second record based on the one or more tests.

11. The method of claim 1, the script execution engine is a standardized script execution engine used for at least the first monitoring script and the second monitoring script.

12. A non-transitory computer-readable medium having computer-executable instructions stored thereon that are executed by a processor to:
execute a plurality of monitoring scripts which monitor a plurality of applications using a script execution engine, wherein at least two of the plurality of applications running on different operating systems;
gather a plurality of monitored indicia using the plurality of monitoring scripts, the plurality of monitored indicia related to functioning of the plurality of applications, the plurality of monitored indicia including metrics, wherein the metrics include a last modified time stamp of a file in a directory of a monitored computing device and a count of a number of files in the directory of the monitored computing device;
generate at least one record relating to an application selected from the plurality of applications, and wherein each record is based on the plurality of monitored indicia and is in a standardized format;
retrieve the at least one record; and
display the plurality of monitored indicia.

13. The medium of claim 12, the script execution engine executes each of the plurality of monitoring scripts on a recurring basis according to a predetermined schedule.

14. The medium of claim 12, the non-transitory computer-readable medium having computer-executable instructions stored thereon further including instructions executed to determine a severity level associated with the plurality of monitored indicia.

15. The medium of claim 14, the non-transitory computer-readable medium having computer-executable instructions stored thereon further including instructions executed to display the plurality of monitored indicia for each of the plurality of applications via a standardized monitoring console, and wherein the standardized monitoring console includes a predefined view showing information derived from each record having a severity level indicative of a problem with a corresponding application.

16. A system, comprising:
a processor;
a memory storing computer-readable instructions, the computer-readable instructions executable by the processor to:
execute a plurality of monitoring scripts which monitor a plurality of applications using a script execution engine, two or more of the plurality of applications running on different operating systems;
gather monitored indicia using the plurality of monitoring scripts, the monitored indicia related to functioning of the plurality of applications the monitored indicia including metrics, the metrics including include a last modified time stamp of a file in a directory of a monitored computing device, and a count of a number of files in the directory of the monitored computing device;
generate records, wherein each record among the records relates to an application selected from the plurality of applications running on different operating systems, each record is in a standardized format;
retrieve the records; and
display the monitored indicia.

17. The system of claim 16, the computer-readable instructions executable by the processor further include instructions to:
   determine a severity level based on the monitored indicia; and
   take an action when the severity level associated with the monitored indicia exceeds a threshold severity level.

18. The system of claim 17, wherein the action taken includes at least one of displaying the monitored indicia via a standardized monitoring console and notifying a party remote to the standardized monitoring console.

19. The system of claim 17, wherein the action taken includes a prescriptive action that corrects a cause of the indicia exceeding the threshold severity level, the prescriptive action includes at least one of resetting at least one of the plurality of applications, or shutting down at least one of the plurality of applications.

20. The system of claim 16, the plurality of monitoring scripts gather the monitored indicia from components of at least one of the plurality of applications, that include at least one of a database associated with the at least one of the plurality of applications, an operating system upon which the at least one of the plurality of applications is executing, a file system associated with the at least one of the plurality of applications, and a command line utility of the at least one of the plurality of applications.

* * * * *